United States Patent [19]

Bagga et al.

[11] Patent Number: 4,734,332
[45] Date of Patent: Mar. 29, 1988

[54] METHOD FOR EFFECTING ADHESION USING LAMINATES FROM EPOXY RESINS

[75] Inventors: Madan M. Bagga, Cambridge; Christopher H. Bull, Trumpington, both of England

[73] Assignee: Ciba-Geigy Corporation, Ardsley, N.Y.

[21] Appl. No.: 2,355

[22] Filed: Jan. 12, 1987

Related U.S. Application Data

[62] Division of Ser. No. 847,371, Apr. 2, 1986, Pat. No. 4,659,779.

[30] Foreign Application Priority Data

Apr. 2, 1985 [GB] United Kingdom ............... 8508628

[51] Int. Cl.$^4$ .............................................. C09J 5/02
[52] U.S. Cl. ................................. 428/414; 156/307.7; 156/330; 428/416
[58] Field of Search ......................... 428/416, 414; 156/307.7, 330

[56] References Cited

U.S. PATENT DOCUMENTS

| | | | |
|---|---|---|---|
| 3,519,576 | 7/1970 | Johnson | 260/2 |
| 3,520,905 | 7/1970 | Johnson | 260/345.2 |
| 3,884,992 | 5/1975 | Shimizu et al. | 525/118 X |
| 4,021,403 | 5/1977 | Fujiwara et al. | 428/416 X |
| 4,246,162 | 1/1981 | Schreiber | 525/109 X |
| 4,273,889 | 6/1981 | Yamazaki et al. | 525/109 |
| 4,388,451 | 6/1983 | Culbertson et al. | 525/113 X |
| 4,399,257 | 8/1983 | Kitsuda et al. | 525/118 |
| 4,593,056 | 6/1986 | Qureshi et al. | 525/113 X |
| 4,626,474 | 12/1986 | Kim | 428/416 |

FOREIGN PATENT DOCUMENTS 103804  3/1984  European Pat. Off. .

OTHER PUBLICATIONS

Chemical Abstracts 98, 144488m (1983).
Derwent Abstract 85–046905/08.
Derwent Abstract 85–046906/08.
Derwent Abstract 85–046907/08.

*Primary Examiner*—Earl Nielsen
*Attorney, Agent, or Firm*—Luther A. R. Hall

[57] ABSTRACT

Compositions useful as adhesives, sealants, laminating resins and coatings comprise
(a) an epoxide resin
(b) a nitrogen-containing latent curing agent for this resin, such as dicyandiamide or isophthalic acid dihydrazide and
(c) as accelerator for the cure, and dispersed as a powder in (a) and (b), a solid solution of a nitrogen base having a boiling point above 130° C. and a polymer of an unsaturated phenol.

Typical nitrogen bases used in (c) include benzyldimethylamine, 2-methylaminoethanol, isophorone diamine triethylene tetramine, and 2-methylimidazole. Typical polymeric phenols include poly(p-vinylphenol).

20 Claims, No Drawings

METHOD FOR EFFECTING ADHESION USING LAMINATES FROM EPOXY RESINS

This is a divisional of application Ser. No. 847,371, filed on Apr. 2, 1986, now U.S. Pat. No. 4,659,779, issued on Apr. 21, 1987.

This invention relates to new curable compositions and to their use as adhesives, sealants, laminating resins, and coatings.

The use of expoxide resins as adhesive and coatings has been commercial practice for several decades. Many hardeners are reactive at room temperature and so need to be mixed with the epoxide resin just prior to use. Others are stable in admixture with the epoxide resin at room temperature, and start to harden only when heated above a certain 'threshold temperature'. These hardeners, the so-called 'latent hardeners', are available commercially and include a number of chemically different types, such as polycarboxylic acid hydrazides, aminotriazines, boron trifluoride complexes, boron trichloride-tertiary amine complexes, polyphenols, polycarboxylic acids, dicyandiamide, imidazoles, and organic metal compounds.

Compositions containing an epoxide resin and a latent hardener generally take 15 minutes to 1 hour to cure at temperatures of about 180° C. Cure times can be shortened by incorporation of latent accelerators which have little effect on storage stability at ambient temperatures but which enable solidification of the mixture to take place within about 30 minutes at 120° C. For instance, if dicyandiamide is used as the hardener, an accelerator is often used that is a substituted phenylurea, such as N-(4-chlorophenyl)-N',N'-dimethyl urea. A more rapid solidification of such mixtures may be obtained by heating to a higher temperature but, at temperatures of around 200° C., this type of accelerator evolves volatiles which cause bubbling in the hardening mixture. The presence of such bubbles in a glue line is obviously a very serious drawback, since any bond so affected is much weaker than one formed with no bubbles. Similarly a bubbled mixture could not be used to prepare satisfactory coatings or laminates. It is therefore common practice to cure such mixtures at temperatures below about 150° C., at which temperature solidification takes about 5 minutes.

There is a desire in some sections of the automobile industry to replace spot welding of some components by adhesive bonding. In order to compete with welding, an adhesive is required that is capable of solidifying within a few seconds at high temperature and which will give a cured product of high joint strength. In order to maintain production line speed it is essential that components to be joined are heated rapidly. Induction heating is a very rapid heating method, giving high temperatures within a few seconds. However, if such a heating method is used, fine control over the temperature is often difficult because of the geometry of the assembly. Accelerators that cause bubbling at high temperature are therefore unsuitable.

Epoxide resins form bonds of very high strength, and would be suitable for the bonding of automobile components except that conventional formulations suffer from one or more of the following drawbacks: insufficient stability on ambient temperature storage, insufficient rapidity of hardening when heated, and formation of bubbles at high curing temperatures. It has now been found that these drawbacks can be overcome, and a storage stable epoxide resin formulation that cures very rapidly at temperatures in the region of 180°-200° C. without formation of bubbles obtained, by use of a combination of an epoxide resin, a nitrogen-containing latent curing agent, particularly one containing amino-, imino-, amido-, imido-, triazino- or hydrazide groups and, as accelerator, a solid solution of a polymeric phenol with a high-boiling basic nitrogen compound, as hereinafter defined.

The use of phenol-amine salts as latent curing agents for epoxy resins is well known, having been described in, for example, U.S. Pat. Nos. 3,519,576 and 3,520,905. In these patents there are described crystalline polyphenate salts of a polyamine and a polyhydric phenol. Suitable polyamines may contain any combination of primary, secondary, or tertiary aliphatic or aromatic amino groups. Polyamines that, when used separately, give rapid cure of epoxide resins at room temperature, such as 1,3-propanediamine, ethylenediamine, and triethylenetetramine are preferred. The polyhydric phenols mentioned include resorcinol, bisphenol A, 4,4'-dihydroxybiphenyl, and 2,4,4-trimethyl-2',4',7-trihydroxyflavan. The use of these salts as accelerators for the cure of epoxide resins is not disclosed.

The addition of stoichiometric amounts of polymeric phenols to epoxy resins in order to cure them is a standard commercial process, as is the use of amines as accelerators of such cure. Japanese Kokai No. 57.182316, abstracted in Chemical Abstracts, 98:144488m, for example, discloses a composition containing a poly(vinylphenol), an epoxide resin and, as hardening accelerator, an organic amine and dicyandiamide. The prior preparation of the salt of the phenol with the amine is not described.

This invention provides storage stable compositions comprising (a) an epoxide resin (b) a nitrogen-containing latent curing agent for the epoxide resin and (c) as accelerator for the cure and dispersed as a powder in a mixture of (a) and (b), a solid solution of a nitrogen base having a boiling point above 130° C., preferably above 150° C., and a phenolic polymer which is an addition polymer of a phenol bearing an unsaturated substituent.

The term 'solid solution' as used with reference to component (c), is intended to indicate a combination of the nitrogen base and the phenolic polymer in a single solid phase. It is possible that there is some salt formation between the two components. It is also possible that there is hydrogen bonding between them. Such solid solutions are not usually made using stoichiometric quantities of the components and so they will usually contain one component in excess of the other. The term 'solid solution' covers all such products, whether containing salts of the base and the phenolic polymer and whether containing an excess of either component. The solid solution (c) as hereinbefore defined is believed to be novel.

Epoxide resins (a) which may be employed in the new compositions are preferably those containing at least two groups of formula

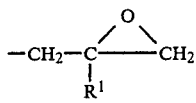

$$\text{—CH}_2\text{—C}\underset{R^1}{\overset{O}{\diagup\!\!\!\diagdown}}\text{CH}_2 \qquad I$$

directly attached to an atom or atoms of oxygen, nitrogen, or sulphur, where $R^1$ denotes a hydrogen atom or a methyl group.

As examples of such resins may be mentioned polyglycidyl and poly(beta-methylglycidyl) esters obtainable by reaction of a compound containing two or more carboxylic acid groups per molecule with epichlorohydrin, glycerol dichlorohydrin, or beta-methylepichlorohydrin in the presence of an alkali. Such polyglycidyl esters may be derived from aliphatic carboxylic acids, e.g., oxalic acid, succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Further examples are polyglycidyl and poly(beta-methylglycidyl) ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene)-glycols, propane-1,2-diol and poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol, sorbitol, and polyepichlorohydrins; from cycloaliphatic alcohols such as resorcitol, quinitol, bis(4-hydroxycyclohexyl)methane, 2,2-bis(4-hydroxycyclohexyl)propane, and 1,1-bis(hydroxymethyl)cyclohex-3-ene; and from alcohols having aromatic nuclei, such as N,N-bis(2-hydroxyethyl)aniline and p,p'-bis(2-hydroxyethylamino)diphenylmethane. They may also be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl) sulphone,1,1,2,2-tetrakis(4-hydroxyphenyl)ethane, 2,2-bis(4-hydroxyphenyl)-propane, 2,2-bis(3,5-dibromo-4-hydroxyphenyl) propane, and novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, such as 4-chlorophenol,2-methylphenol, and 4-tert.butylphenol.

Poly(N-glycidyl) compounds include, for example, those obtained by dehydrochlorination of the reaction products of epichlorohydrin with amines containing at least two aminohydrogen atoms, such as aniline, n-butylamine, bis(4-aminophenyl)methane, m-xylylenediamine, and bis(4-methylaminophenyl)methane; triglycidyl isocyanurate; and N,N'-diglycidyl derivatives of cyclic alkylene ureas, such as ethyleneurea and 1,3-propyleneurea, and of a hydantoin such as 5,5-dimethylhydantoin.

Examples of poly(S-glycidyl) compounds are di-S-glycidyl derivatives of dithiols such as ethane-1,2-dithiol and bis(4-mercaptomethylphenyl) ether.

Epoxide resins having the 1,2-epoxide groups attached to different kinds of hetero atoms may be employed, e.g., the N,N,O-triglycidyl derivative of 4-aminophenol, the glycidyl ether-glycidyl ester of salicylic acid, N-glycidyl-N'-(2-glycidyloxypropyl)-5,5-dimethylhydantoin, and 2-glycidyloxy-1,3-bis(5,5-dimethyl-1-glycidylhydantoin-3-yl)propane.

If desired, a mixture of epoxide resins may be used.

Preferred epoxide resins are liquids, and include polyglycidyl ethers, polyglycidyl esters, N,N'-diglycidylhydantoins, and poly(N-glycidyl) derivatives of aromatic amines. Specific preferred resins are polyglycidyl ethers of 2,2-bis(4-hydroxyphenyl)propane, of bis(4-hydroxyphenyl)methane, or of a novolak formed from formaldehyde and phenol, or phenol substituted in the ring by one chlorine atom or by one alkyl hydrocarbon group containing from one to nine carbon atoms, and having a 1,2-epoxide content of at least 0.5 equivalent per kilogram, bis(4-diglycidylamino)phenyl)methane, and p-(diglycidylamino)phenyl glycidyl ether.

The nitrogen-containing latent curing agent (b) used in the new compositions may be any substance that remains inert towards epoxide resins below a certain 'threshold' temperature, which is usually at least 80° C., and preferably 100° C. or above, but reacts rapidly to effect curing once that threshold temperature has been exceeded. Such materials are well known and commercially available and include boron trichloride/amine and boron trifluoride/amine complexes, dicyandiamide, melamine, diallylmelamine, guanamines such as acetoguanamine and benzoguanamine, aminotriazoles such as 3-amino-1,2,4-triazole, hydrazides such as adipic dihydrazide, stearic dihydrazide, isophthalic dihydrazide, semicarbazide, cyanoacetamide, and aromatic polyamines such as diaminodiphenylsulphones. The use of dicyandiamide, isophthalic acid dihydrazide, adipic acid dihydrazide and 4,4'-diaminodiphenylsulphone is particularly preferred.

The solid solution (c) used as accelerator in the new compositions is prepared and powdered prior to admixture with the resin (a) and curing agent (b). If the solid solution (c) is not prepared prior to admixture with the resin and curing agent, but an attempt is made to prepare it in situ in the epoxy resin, a storage stable mixture is not obtained.

The phenolic polymer used to prepare the solid solutions (c) are materials having more than two repeating units having at least one phenolic hydroxyl group per unit. Such polymers may be homopolymers or copolymers of a phenol bearing an unsaturated substituent.

As examples of such polymers there may be mentioned homopolymers of allyl-substituted phenols, such as 2-allylphenol and 4-allylphenol; homopolymers of phenols having substituents containing acrylic unsaturation, for example phenols which are reaction products of an acid halide of a phenolic hydroxyl group-containing carboxylic acid such as salicylic acid or p-hydroxybenzoic acid with a hydroxyalkyl acrylate or methacrylate such as 2-hydroxyethyl methacrylate; homopolymers of vinyl- or 1-propenyl-substituted phenols such as o-vinylphenol, m-vinylphenol, p-vinylphenol and halogenated derivatives thereof, and o-(1-propenyl)phenol, m-(1-propenyl)phenol, p-(1-propenyl) and halogenated derivatives thereof; copolymers of any of the above-mentioned phenols with at least one other polymerisable ethylenically unsaturated material, for example a styrene such as styrene itself, alphamethylstyrene, 4-bromostyrene and 4-methylstyrene, an acrylic ester such as an alkyl acrylate or methacrylate or a hydroxyalkyl acrylate or methacrylate, or a vinyl ester such as vinyl acetate; and mixtures of two or more of the abovementioned homopolymers and/or copolymers. The addition homopolymers and copolymers of unsaturated phenols can be prepared using conventional polymerisation techniques, either from the unsaturated phenols themselves or from their esters or ethers. When the esters or ethers are used, the resulting polymers can be hydrolysed to convert the ester or ether groups to free phenolic hydroxyl groups.

Preferred phenolic polymers are those of the general formula

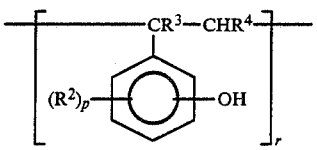

II where
R² represents a halogen atom or a hydroxy, alkyl, alkoxy aryl, aralkyl or hydroxyaralkyl group,
R³ and R⁴ are the same or different and represent hydrogen atoms or straight chain or branched alkyl groups having from 1 to 4 carbon atoms,
p represents zero or an integer of from 1 to 4,
r represents an integer such that the average molecular weight of the polymer is within the range 1500–10,000.

Phenolic polymers of formula II where r represents an integer such that the average molecular weight of the polymer is above 10,000, particularly from 10,001 to 30,000, can also be used.

Preferred polymeric phenols of formula II are those wherein R² represents a halogen atom, R³ and R⁴ represent hydrogen, and p represents zero or 1. The indicated —OH group is preferably para to the group —CR³—CHR⁴—. Such polymeric phenols are commercially available.

Other preferred polymeric phenols are copolymers containing units of formula

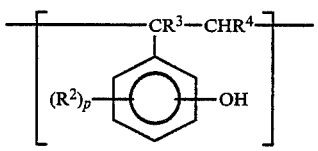

III where R², R³, R⁴ and p are as hereinbefore defined, and units derived from an alkyl or hydroxyalkyl acrylate or methacrylate, the copolymers generally having average molecular weights from 1500 to 30,000. Examples of such copolymers are those having units of formula III where R² represents a halogen atom, R³ and R⁴ represent hydrogen and p represents zero or 1, and units derived from methyl methacrylate or hydroxyethyl methacrylate as comonomer.

The nitrogen bases used to make the solid solutions (c) may be primary, secondary or tertiary amines or basic nitrogen-containing heterocycles such as imidazoles. Thus suitable bases include tertiary monoamines, secondary monoamines, primary, secondary and tertiary diamines, tertiary triamines, mixed polyamines and nitrogen heterocycles. Examples of suitable bases having a boiling point, at atmospheric pressure, above 130° C. are tertiary monoamines such as 2-(N,N-dimethylamino)ethanol, secondary monoamines such as diisobutylamine, primary diamines such as 1,3-diaminopropane and 1,3-diaminobutane, secondary diamines such as piperazine, mixed polyamines such as 3-(dimethylamino)propylamine, and nitrogen heterocycles such as 3-methylpyridine or 4-methylpyridine.

Preferred bases are those having a boiling point, at atmospheric pressure, above 150° C. Examples of such preferred bases are tertiary monoamines such as tri-n-butylamine, tri-isobutylamine, octyldimethylamine, benzyldimethylamine, tri-n-propylamine, trihexylamine, N,N-diethylcyclohexylamine, 2-(diethylamino)ethanol, 3-(dimethylamino)-1-propanol and 2-(dimethylaminomethyl)phenol; secondary monoamines such as 2-(methylamino)ethanol, di-n-amylamine and di-isoamylamine; primary diamines such as isophorone diamine (5-aminoethyl-3,5,5-trimethylcyclohexylamine), 1,4-diaminobutane, 1,5-diaminopentane and hexamethylene diamine; secondary diamines such as N,N'-diethylene diamine; tertiary diamines such as N,N,N',N'-tetramethylbutanediamine, 1,7-bis(dimethylamino)heptane and bis(4-dimethylaminophenyl)methane; tertiary triamines such as 2,4,6-tris(dimethylaminomethyl)phenol; mixed polyamines such as triethylenetetramine, tetraethylenepentamine, diethylene triamine, 3-(diethylamino)propylamine, and N-(2-aminoethyl)piperazine; and nitrogen heterocycles such as 1-methylimidazole, 2-methylimidazole, benzimidazole, 2-phenylimidazole and quinoline.

Particularly preferred bases are benzyldimethylamine, 2,4,6-tris(dimethylaminomethyl)phenol, octyldimethylamine, triethylenetetramine, isophorone diamine, 2-(methylamino)ethanol, 2-methylimidazole, benzimidazole, 2-phenylimidazole, 1-methylimidazole, 3-(dimethylamino)-1-propanol, and N-(2-aminoethyl)piperazine, Particularly preferred solid solutions (c) are those of the particularly preferred bases and poly(p-vinylphenols having molecular weights of 3000 to 10,000.

The solid solutions may be prepared by heating the phenolic polymer and the nitrogen base together, either in the absence of a solvent or in a lower alcohol, particularly methanol, until a clear liquid is obtained, and then evaporating any solvent present. Usually no further purification is necessary. The weight ratio of polymer to nitrogen base must be such as to give a solid, stable product and is generally within the range 0.8–4.0:1, especially 1.0–3.0:1. It will be appreciated that such ratios are not necessarily stoichiometric and, since generally no attempt is made to purify the products, they usually comprise mixtures. This fact is in no way deleterious to the successful utilisation of the compositions of the invention.

The amount of latent curing agent (b) used in the compositions of the present invention is not critical and will be that amount used conventionally for the particular curing agent and epoxide resin. Such amounts are well known by those familiar with the formulation of epoxide resin systems. As a guide, the amount of curing agent is generally within the range 1 to 30 parts by weight, especially 5 to 10 parts by weight, per 100 parts by weight of the epoxide resin (a).

The amount of the accelerator (c) used in the present compositions is also not critical, provided sufficient is present to give an accelerating effect. Generally amounts within the range 0.1 to 10%, and especially 0.5 to 5% by weight of the epoxide resin (a), are used.

Curable compositions as described may be used as coatings, sealants, laminating resins, and, more especially, as adhesives. This invention also provides a method for effecting adhesion between two surfaces, particularly metal surfaces, which comprises applying a composition as described to one or both surfaces, placing the two surfaces together with the composition positioned therebetween, and heating the assembly until the composition solidifies. Temperatures within the range 150°–220° C. are preferred, especially 175°–200° C., such that solidification occurs within a period of 5 seconds to 10 minutes, especially 10 seconds to 5 minutes. The method may be used to bond surfaces of metal, such as steel or aluminium, plastic materials, glass, friction materials such as brake linings, and ceramic materials. It is particularly useful where both surfaces are of metal.

Additives that may be incorporated into the new compositions in order to improve their physical or chemical properties in the cured or uncured state include for example pigments, dyes, flexibilisers, plasticisers, fillers, thixotropic agents, and fire retardants.

The invention will now be illustrated by reference to the following Examples in which all parts are by weight. The accelerators used in these Examples are prepared as follows:

ACCELERATOR I

Poly(p-vinylphenol) having a weight average molecular weight 5000 and available from Maruzen Oil Co. Ltd., Tokyo, Japan, under the designation "Resin M Grade S-2" (36.0 g) and methanol (30 ml) are stirred and warmed to about 50° C. until a clear solution is obtained. The solution is treated by dropwise addition of benzyldimethylamine (20 g) and the mixture is stirred for ½ hour at about 50° C.

The methanol is removed by distillation at atmospheric pressure, the final temperature of the residue being 140° C., and then the pressure is lowered to 400 mm Hg whilst maintaining the temperature at about 140° C. for ½ hour. The hot mixture is poured into aluminium trays where it cools to a brittle solid which is ground to a fine powder, hereinafter called Accelerator I.

ACCELERATOR II

Resin M Grade S-2 (36.0 g) is dissolved in methanol (75 ml) at ambient temperature and 2,4,6-tris(dimethylaminomethyl)phenol (36.0 g) added dropwise with stirring. The mixture is stirred for a further ½ hour at ambient temperature and the methanol removed by distillation at atmospheric pressure, last traces being removed under a pressure of 400 mm Hg and at 150°–160° C. The hot mixture is poured into aluminium trays where it solidifies to a brittle solid that is ground to a fine powder, hereinafter called Accelerator II.

ACCELERATOR III

Resin M Grade S-2 (10.0 g) and octyldimethylamine (7.0 g) are stirred together at ambient temperature to give a slurry. This slurry is slowly heated to 160° C., whilst the stirring is maintained. It is kept at 160° C. for 5 minutes, at which temperature the mixture is a clear, mobile liquid, and then it is poured into aluminium trays to cool. The resultant brown, brittle solid is ground to a powder to give Accelerator III.

ACCELERATOR IV

The process used to make Accelerator III is repeated, replacing the amine used in that process by triethylenetetramine (5.0 g). Accelerator IV is a brown, brittle solid that is ground to a powder.

ACCELERATOR V

The process used to make Accelerator III is repeated, replacing the amine used in that process by isophoronediamine (10 g) and restricting the maximum temperature to 140° C. Accelerator V is a brown, brittle solid that is ground to a powder.

ACCELERATOR VI

The process used to make Accelerator III is repeated, replacing the amine used in that process by 2-methylaminoethanol (5 g) and restricting the maximum temperature to 150° C. Accelerator VI is a brown brittle solid that is ground to a powder.

ACCELERATOR VII

The process used to make Accelerator III is repeated, replacing the amine used in that process by 2-methylimidazole (5.5 g) and restricting the maximum temperature to 150° C. Accelerator VII is a brown, brittle solid that is ground to a powder.

ACCELERATOR VIII

Resin M Grade S-2 (100.0 g) is dissolved in methanol (150 ml) at 40°–45° C. and benzimidazole (100 g) is added with stirring. The mixture is stirred for a further 15 minutes at this temperature. Methanol is removed by distillation at atmospheric pressure, the temperature in the reaction vessel being allowed to rise to 160° C. Last traces of methanol are removed under a pressure of 400 mm Hg at 160° C. The mixture is held for a further 1½ hours at 160° C. and then poured into aluminium trays where it solidifies to a brittle solid that is ground to a fine powder, hereinafter called Accelerator VIII.

ACCELERATOR IX

Resin M Grade S-2 (10.0 g) is dissolved in methanol (20.0 ml) at ambient temperature and 2-phenylimidazole (10.0 g) is added with stirring. The mixture is stirred for a further 15 minutes at ambient temperature followed by 15 minutes at 50°–55° C. Methanol is removed by distillation under a pressure of 20 mm Hg at 60° C. to obtain a brittle solid that is ground to a fine powder, hereinafter called Accelerator IX.

ACCELERATOR X

Resin M Grade S-2 (100.0 g) is dissolved in methanol (100 ml) at 45°–50° C. and 1-methylimidazole (55.56 g) is added dropwise with stirring at this temperature. The mixture is stirred for a further one hour at this temperature. Methanol is removed by distillation at atmospheric pressure, the temperature in the reaction vessel being allowed to rise to 140° C. Last traces of methanol are removed under a pressure of 400 mm Hg at 140° C. The mixture is held for a further 1½ hours at 140° C. and then poured into aluminium trays, where it solidifies to a hard brittle brown solid that is ground to a fine powder which is suitable for use as an accelerator (c) in a composition of the invention.

ACCELERATOR XI

Resin M Grade S-2 (2.0 g) and 3-(dimethylamino)-1-propanol (1.0 g) are mixed at room temperature to obtain a thick slurry. This slurry is heated with mixing to 140° C. until the Resin M dissolves in the amine to form a clear melt. This is held for a further 15 minutes at 140° C. and poured out into aluminium trays, where it solidifies to a brittle brown solid which is ground to a fine powder which is suitable for use as an accelerator (c) in a composition of the invention.

ACCELERATOR XI

Resin M Grade S-2 (2.0 g) and 3-(dimethylamino)-1-propanol (1.0 g) are mixed at room temperature to obtain a thick slurry. This slurry is heated with mixing to 140° C. until the Resin M dissolves in the amine to form a clear melt. This is held for a further 15 minutes at 140° C. and poured out into aluminium trays, where it solidifies to a brittle brown solid which is ground to a fine powder which is suitable for use as an accelerator (c) in a composition of the invention.

ACCELERATOR XII

The process used to make Accelerator XI is repeated, replacing the amine used in that process by 2-(dimethylaminomethyl)phenol (1.5 g). A brittle brown solid is obtained which is ground to a fine powder which is suitable for use as an accelerator (c) in a composition of the invention.

ACCELERATOR XIII

Resin M Grade S-2 (600.0 g) is dissolved in methanol (1050 ml) at 35° C. and 2,4,6-tris(dimethylaminomethyl)phenol (660.0 g) is added dropwise with stirring. The mixture is stirred for 30 minutes at 35° C. and the methanol is removed by distillation at atmospheric pressure at 130°-135° C., last traces being removed under a pressure of 400 mm Hg at 130°-135° C. for 30 minutes. The hot mixture is poured into aluminium trays where it solidifies to a brittle solid that is ground to a fine powder which is suitable for use as an accelerator (c) in a composition of the invention.

ACCELERATOR XIV

The process used to make Accelerator XI is repeated, replacing the amine used in that process by 3-(dimethylamino)propylamine (1.0 g). A brittle brown solid is obtained. This is ground to a fine powder which is suitable for use as an accelerator (c) in a composition of the invention.

ACCELERATOR XV

The process used to make Accelerator XI is repeated, replacing the amine used in that process by N-(2-aminoethyl) piperazine. A brittle brown solid is obtained. This is ground to a fine powder which is suitable for use as an accelerator (c) in a composition of the invention.

ACCELERATOR XVI

A mixture of poly(p-vinylphenol) having a weight average molecular weight of 10,000 and available from Maruzen Oil Co. Ltd., Tokyo, Japan, under the designation 'Resin M Grade S-3' (54.0 g) and benzyldimethylamine (30.0 g) is slowly heated to 180° C. The mixture is kept at 180° C. for 10 minutes, at which temperature it is a clear, mobile liquid, and then it is poured into an aluminium tray to cool. The resultant brown, brittle solid is ground to a powder to give Accelerator XVI.

ACCELERATOR XVII

Resin M Grade S-2 (12.0 g) is dissolved in methanol (25 ml) at ambient temperature and 2,4,6-tris(dimethylaminomethyl) phenol (12.0 g) is added dropwise with stirring. The mixture is stirred for a further 30 minutes at ambient temperature and then stirred for a further 30 minutes at 70° C. After removal of the methanol under reduced pressure at 70° C., the residue is a friable solid, which is ground to a powder to give Accelerator XVII.

EXAMPLE 1

A diglycidyl ether of bisphenol A, having an epoxide content of 5.2 equivalents/kg (100 parts) is mixed with dicyandiamide (7.5 parts), highly-dispersed silica (5.0 parts) and Accelerator I (2.8 parts). This mixture is stable for over one year at 23° C. and for over 4½ months at 40° C. A sample of this mixture is placed on a steel hotplate heated at 180° C. Solidification occurs within 2.8 minutes.

When a layer 2 mm thick of the mixture containing added talc (60 parts) is heated rapidly to 200° C. there is no evidence of bubble formation.

EXAMPLE 2

Example 1 is repeated, using 5.6 parts of Accelerator I. Solidification occurs within 1.3 minutes and the mixture is stable for over 4½ months at 40° C.

EXAMPLE 3

Example 1 is repeated, replacing the accelerator used in that Example by Accelerator II (1.5 parts). Solidification occurs within 2.2 minutes at 180° C., the mixture being stable for 7–8 months at 40° C. When a layer of the mixture 2 mm thick containing added talc (60 parts) is heated rapidly to 200° C., there is no evidence of bubble formation.

EXAMPLE 4

Example 1 is repeated, replacing the accelerator used in that Example by Accelerator III (4.9 parts). Solidification occurs within 1.0 minute at 180° C., the mixture being stable for 6–7 months at 40° C. When a layer of the mixture 2 mm thick containing added talc (60 parts) is heated rapidly to 200° C. there is no evidence of bubble formation.

EXAMPLE 5

Example 1 is repeated, replacing the accelerator used in that Example by Accelerator IV (6.0 parts). Solidification occurs within 1.6 minutes at 180° C., the mixture being stable for 3–4 months at 40° C. When a layer 2 mm thick of the mixture containing added talc (60 parts) is heated rapidly to 200° C., there is no evidence of bubble formation.

EXAMPLE 6

Example 1 is repeated, replacing the accelerator used in that Example by Accelerator V (4.0 parts). Solidification occurs within 5.2 minutes at 180° C., the mixture being stable for 3–4 months at 40° C. When a layer 2 mm thick of the mixture containing added talc (60 parts) is heated rapidly to 200° C., there is no evidence of bubble formation.

EXAMPLE 7

Example 1 is repeated, replacing the accelerator used in that Example by Accelerator VI (6.0 parts). Solidification occurs within 1.0 minute at 180° C., the mixture being stable for 6–7 days at 40° C. When a layer 2 mm thick of the mixture containing added talc (60 parts) is rapidly heated to 200° C., there is no evidence of bubble formation.

EXAMPLE 8

Example 1 is repeated, replacing the accelerator used in that Example by Accelerator VII (5.6 parts). Solidification occurs within 0.3 minute at 180° C., the mixture having a storage life of 4 weeks at 40° C. When a layer 2 mm thick of the mixture containing added talc (60 parts) is heated rapidly to 200° C., there is no evidence of bubble formation.

EXAMPLE 9

The epoxide resin described in Example 1 (100 parts) is mixed with isophthalic acid dihydrazide (25.2 parts), highly dispersed silica (5.0 parts) and Accelerator VIII (2.0 parts). A sample of this mixture is placed on a hotplate at 180° C. Solidification occurs after 1.0 minute, the mixture having a storage life of 13–14 days at 40° C. When a layer 2 mm thick of the mixture containing added talc (60 parts) is heated rapidly to 200° C., there is no evidence of bubble formation.

EXAMPLE 10

Example 9 is repeated, replacing the accelerator by Accelerator IX (2.0 parts). Solidification occurs within 0.7 minute at 180° C., the mixture having a storage life of 6–7 days at 40° C. When a layer 2 mm thick of the mixture containing added talc (60 parts) is heated rapidly to 200° C., there is no evidence of bubble formation.

EXAMPLE 11

Example 9 is repeated, replacing the accelerator used in that Example by Accelerator XVI. Solidification occurs within 1.7 minutes, the mixture being stable for more than 5 weeks at 40° C. When a layer 2 mm thick of this mixture containing added talc (60 parts) is heated rapidly to 200° C., there is no evidence of bubble formation.

EXAMPLE 12

The epoxide resin used in Example 1 (100 parts) is mixed with adipic acid dihydrazide (23.1 parts), highly dispersed silica (5.0 parts) and Accelerator I (2.8 parts). A sample of this mixture is placed on a hotplate at 180° C. Solidification occurs within 1.0 minute, the mixture being stable for more than 5 weeks at 40° C. When a layer 2 mm thick of this mixture containing added talc (60 parts) is heated rapidly to 200° C., there is no evidence of bubble formation.

EXAMPLE 13

Example 12 is repeated, replacing the accelerator used in that Example by Accelerator III (4.0 parts). Solidification occurs within 0.9 minute at 180° C., the mixture being stable for more than 5 weeks at 40° C. When a layer 2 mm thick of this mixture containing added talc (60 parts) is heated rapidly to 200° C., there is no evidence of bubble formation.

EXAMPLE 14

A composition is prepared containing
epoxide resin: 100 parts
dicyandiamide: 7.5 parts
highly dispersed silica: 5.0 parts
glass microspheres: 1.0 part
Accelerator I: 5.6 parts The epoxide resin used is the same as that used in Example 1. The glass microspheres are incorporated to control glue line thickness.

This composition is applied to degreased, shot-blasted mild steel plates and lap joints are prepared having an overlap area of 645 mm². Cure is effected at 200° C. for 5 minutes, after which the joints are allowed to cool to room temperature. The lap shear strength (average of 3 replicates) is 16.7 MPa.

EXAMPLE 15

A mixture of equal amounts by weight of a N, N, N', N'-tetraglycidyl derivative of bis(4-aminophenyl)methane having an epoxide content of 7.8–8.2 equivalents/kg and a N,N,O-triglycidyl derivative of p-aminophenol having an epoxide content of 9.55 equivs./kg (10 g) is mixed with micronised 4,4'-diaminodiphenylsulphone (2.75 g) and Accelerator XVII (0.13 g). The resulting mixture is stable for 6 days at 60° C.; a sample of this mixture is placed on a hotplate heated at 170° C. Solidification occurs within 18 minutes.

What is claimed is:

1. A method for effecting adhesion between two surfaces which comprises
   (i) applying to at least one of said surfaces a composition comprising
   (a) an epoxide resin,
   (b) an effective amount of a nitrogen-containing latent curing agent for the epoxide resin, and
   (c) as cure accelerator dispersed as a powder in a mixture of (a) and (b), an effective amount of a solid solution of a nitrogen base having a boiling point above 130° C. and a phenolic polymer which is an addition polymer of a phenol bearing an unsaturated substitutent,
   (ii) placing said surfaces together with the composition positioned therebetween to form an assembly, and
   (iii) heating the assembly until the composition solidifies.

2. A method according to claim 1 in which the surfaces are of metal.

3. A method according to claim 1 wherein the epoxide resin (a) is a liquid and is a polyglycidyl ether, a polyglycidyl ester, an N,N'-diglycidylhydantoin or a poly(N-glycidyl) derivative of an aromatic amine.

4. A method according to claim 1 in which the curing agent (b) is a boron trichloride/amine or boron trifluoride/amine complex, dicyandiamide, melamine, diallyl-melamine, a guanamine, an aminotriazole, a hydrazide, semicarbazide, cyanoacetamide or an aromatic polyamine.

5. A method according to claim 4 in which the curing agent (b) is dicyandiamide, isophthalic acid dihydrazide, adipic acid dihydrazide or 4,4'-diaminodiphenyl sulfone.

6. A method according to claim 1 in which the phenolic polymer has the formula

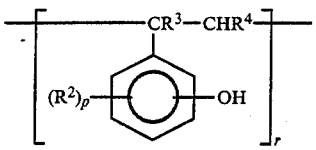

where
- $R^2$ represents a halogen atom or a hydroxy, alkyl, alkoxy, aryl, aralkyl or hydroxyaralkyl group,
- $R^3$ and $R^4$ are the same or different and each represents a hydrogen atom or a straight chain or branched alkyl group having 1 to 4 carbon atoms,
- p represents zero or an integer of from 1 to 4, and
- r represents an integer such that the average molecular weight of the polymer is within the range 1500–10,000.

7. A method according to claim 6 wherein
$R^2$ represents a halogen atom,
$R^3$ and $R^4$ represent hydrogen atoms, and
p represents zero or 1.

8. A method according to claim 7 in which the indicated —OH group is para to the indicated —$CR^3$—$CHR^4$—group.

9. A method according to claim 1 in which the nitrogen base in the solid solution (c) is a tertiary monoamine, secondary monoamine, primary diamine, secondary diamine, tertiary diamine, tertiary triamine, mixed polyamine or nitrogen heterocycle.

10. A method according to claim 9 in which the nitrogen base has a boiling point above 150° C.

11. A method according to claim 10 in which the nitrogen base is benzyldimethylamine, 2,4,6-tris(dimethylaminomethyl)phenol, octyldimethylamine, triethylenetetramine, isophorone diamine, 2-(methylamino)ethanol, 2-methylimidazole, benzimidazole, 2-phenylimidazole, 1-methylimidazole, 3-(dimethylamino)-1-propanol or N-(2-aminoethyl)piperazine.

12. A method according to claim 11 in which the phenolic polymer is a poly(p-vinylphenol) having a molecular weight of 3,000 to 10,000.

13. A method according to claim 1 in which the weight ratio of phenolic polymer to nitrogen base in the solid solution (c) is within the range 0.8–4.0:1.

14. A method according to claim 13 in which the weight ratio of phenolic polymer to nitrogen base in the solid solution is from 1.0 to 3.0:1.

15. A method according to claim 1 in which there is used 1 to 30 parts by weight of the curing agent (b) per 100 parts by weight of the epoxide resin (a).

16. A method according to claim 1 in which there is used 0.1 to 10% of the accelerator (c) by weight of the epoxide resin (a).

17. A method according to claim 16 in which there is used 0.5 to 5% of the accelerator (c) by weight of the epoxide resin (a).

18. A method according to claim 1 in which the assembly is heated at 150° to 220° C.

19. A method according to claim 18 in which the assembly is heated at 175° to 200° C.

20. An assembly comprising two surfaces adhered together by a composition comprising
(a) an epoxide resin,
(b) an effective amount of a nitrogen-containing latent curing agent for the epoxide resin, and
(c) as cure accelerator dispersed as a powder in a mixture of (a) and (b), an effective amount of a solid solution of a nitrogen base having a boiling point above 130° C. and a phenolic polymer which is an addition polymer of a phenol bearing an unsaturated substituent,
said composition being heat-cured.

* * * * *